A. DOBLE.
BRAKE MECHANISM FOR AUTOMOBILES.
APPLICATION FILED DEC. 7, 1916.
1,360,505.
Patented Nov. 30, 1920.
2 SHEETS—SHEET 1.
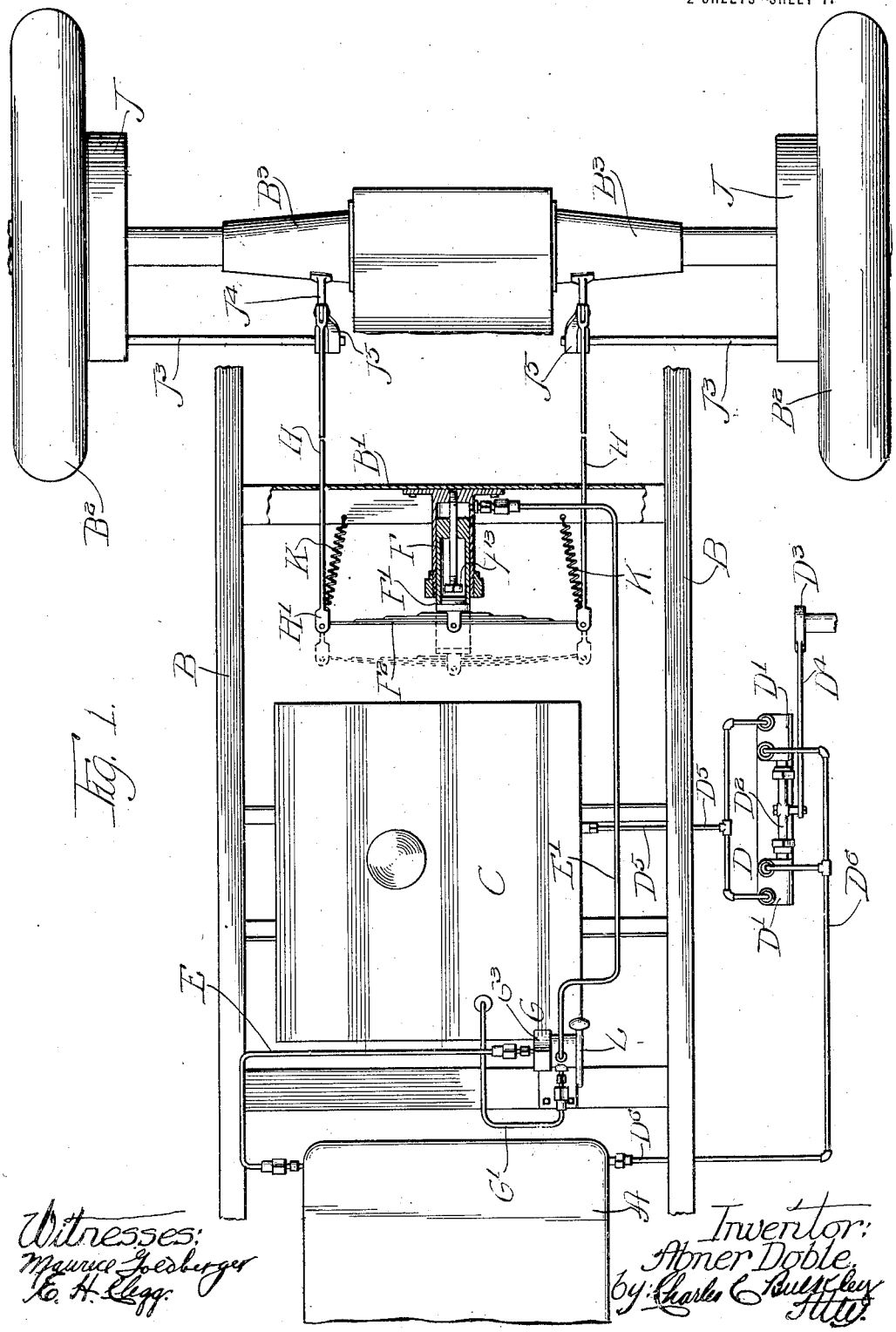

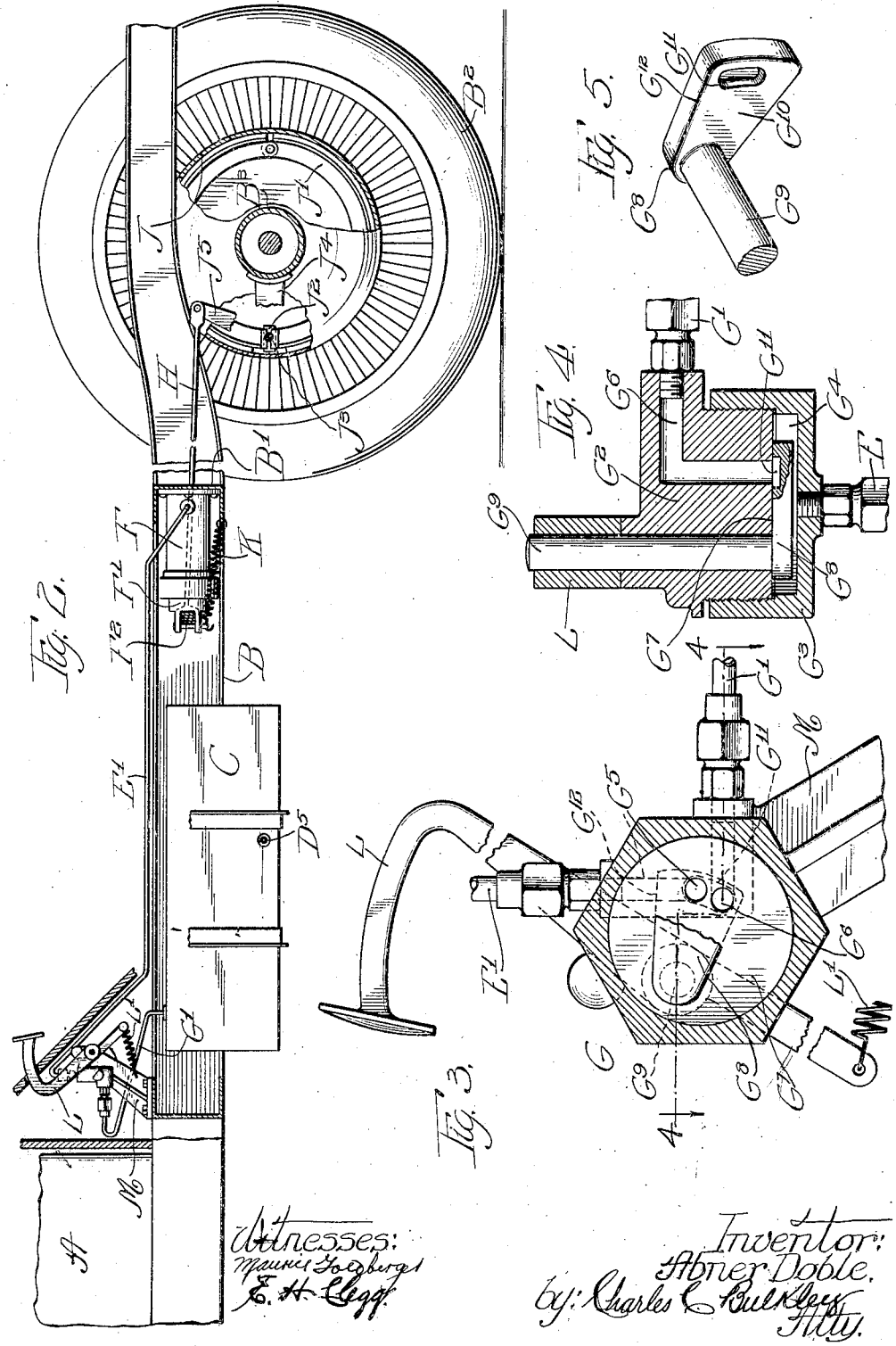

UNITED STATES PATENT OFFICE.

ABNER DOBLE, OF DETROIT, MICHIGAN, ASSIGNOR, BY MESNE ASSIGNMENTS, TO DOBLE-DETROIT STEAM MOTORS CO., OF DETROIT, MICHIGAN, A CORPORATION OF DELAWARE.

BRAKE MECHANISM FOR AUTOMOBILES.

1,360,505.      Specification of Letters Patent.      Patented Nov. 30, 1920.

Application filed December 7, 1916. Serial No. 135,711.

*To all whom it may concern:*

Be it known that I, ABNER DOBLE, a citizen of the United States of America, and resident of Detroit, Wayne county, Michigan, have invented a certain new and useful Improvement in Brake Mechanism for Automobiles, of which the following is a specification.

My invention relates to brake mechanism for power propelled vehicles of the automobile type.

My object is to provide an improved brake system and mechanism for automobiles which will require for its operation practically no physical exertion on the part of the operator, but which will nevertheless be accurately regulable and instantly responsive to the operator's control and which will require no more care and attention than the types of hand and foot power brake mechanism commonly employed in automobiles. And to this end my invention consists in an improved brake mechanism in which hydraulic pressure is employed as the actuating force for the mechanism which applies the braking effort to the wheels of the vehicle whereby the only exertion on the part of the operator is that necessary for the manipulation of a small throttle which controls the application of the hydraulic pressure.

Referring to the accompanying drawings:

Figure 1 is a plan view of the chassis of an automobile showing various parts thereof wherewith to illustrate the application of my invention.

Fig. 2 is a view in elevation, but partly in section, of the structure shown in Fig. 1.

Fig. 3 is an enlarged detail view of the throttle and operating pedal or lever, the throttle casing being partly in section.

Fig. 4 is a detail section on the line 4—4 of Fig. 3.

Fig. 5 is a detail perspective of the movable valve member of the throttle.

My invention contemplates the utilization of water or liquid under pressure as the energizing or actuating force for the brake mechanism, and the provision of means whereby to utilize the water or liquid under pressure. In automobiles of the type where steam is employed as energizing force for the propulsion of the vehicle, a steam generator is necessarily a part of the power plant, and since the water for the generation of steam is supplied to and contained in the generator under pressure I take advantage of this condition and utilize this water pressure from this source. I have illustrated in the drawings an automobile of the steam propelled type, although for the sake of clearness the power plant is omitted with the exception of the steam generator which is indicated at A and which is intended as representative of any suitable or approved steam boiler or generator for the purpose. The frame B of the vehicle supports a suitable tank C which carries a supply of water and the water is drawn from this tank, in accordance with the requirements of the boiler and the brake system, and pumped or injected into the boiler by means of a pump which is represented at D. This pump may be of any suitable type for the purpose, and in practice would be connected with and driven by the motor or engine which propels the vehicle. The pump illustrated is of the double acting type and consists generally of two cylinders $D^1$ each having a piston or plunger therein and a common piston rod $D^2$. This piston rod may be actuated by means of an eccentric $D^3$ through the medium of a suitable connecting rod $D^4$. The two intake ports of the pump are connected by the pipes $D^5$ with the water tank, and the two discharge ports are connected by the pipes $D^6$ with the boiler A so as to supply the water to said boiler under the necessary pressure. The water for actuating the brake mechanism is conducted from this boiler, and since the water is necessarily contained in the boiler or generator A under the steam pressure developed in said boiler the water will be supplied to the brake mechanism under this boiler pressure. The pressure water is conducted to the brake cylinder F by means of the pipe line E and $E^1$, but a throttle G is interposed in this pipe line for the purpose of controlling the flow of water to the brake mechanism, which throttle will be described hereinafter. I provide preferably in the rear portion of the vehicle frame a cylinder F in which a piston or plunger $F^1$ is arranged to reciprocate, this piston being arranged so as to be water tight with respect to the cylinder and to be forced outwardly by the pressure of the water entering the cylinder in the rear of the piston. The outward or forward stroke of the plunger is determined by a limit stop $F^3$ which consists of a stud secured to the bottom of the cylinder and having its head disposed within the hollow end of the plunger. Hence after the plunger has reached its forward limit any additional pressure will have no effect on said plunger. The cylinder is preferably rigidly mounted on a cross beam $B^1$ on the frame. The piston or plunger $F^1$ carries at its outer end a flexible bar member $F^2$ which, in the present construction, is in the form of a flat composite spring composed of a plurality of laminations. This spring is firmly fastened to the end of the plunger and moves with said plunger. This equalizer applies the power of the piston to the brake mechanism for the rear wheels $B^2$ through the medium of brake rods or connecting links H, the forward ends $H^1$ of which are pivotally connected to the outer ends of the equalizer spring. Each of the rear wheels of the vehicle have associated therewith a drum J and expanding brake shoes or rings $J^1$ contained therein which may be and preferably are of the usual or standard type of brake mechanism for automobiles. In the standard brake construction these expanding shoes are usually actuated by a cam $J^2$ which is mounted upon the cam shaft $J^3$ extending substantially parallel with the rear axle and having its inner end suitably mounted in a bearing formed in a bracket $J^4$ on the rear axle housing $B^3$. The inner ends of the shafts carry short upstanding brake levers $J^5$ which, when rotated, actuate the cam shaft and its cam to expand the brake shoes and apply the brakes in the usual manner. The rear ends of the connecting links H are pivotally attached to the ends of these brake levers so as to apply the power of the hydraulic mechanism thereto. It is thus observed that when water is admitted to the cylinder under pressure the piston or plunger F is forced outwardly and through the medium of the equalizer member and the connecting links H operate to actuate the brakes. The spring member flexes in transmitting the power from the plunger to the brake rods, but it is sufficiently stiff to exert the required degree of tension on the brake rods to properly set the brakes to the predetermined maximum holding power when the plunger has reached the forward limit of its movement and still allow for inequalities and wear of the parts. Hence should the boiler pressure go higher than that required for the brakes the excess pressure will have no effect on the brakes.

In this structure the restoration of the brake mechanism to its normal condition is brought about by means of a pair of springs K which, as shown more clearly in Fig. 1, are attached to the outer ends of the equalizer member and to the cross beam $B^1$ of the frame respectively. As soon as the pressure on the piston or plunger is relieved these springs operate to restore the plunger to its normal position and in doing so it forces the water out of the cylinder. In accordance with the purpose of my invention I conserve the water supply by restoring it to the supply tank. Hence I arrange the connection so that the water from the brake cylinder will be forced back through the pipe line $E^1$ and the throttle G, and thence into the tank through a pipe $G^1$ which is connected with the throttle and with the tank. Referring now more particularly to Figs. 3, 4 and 5, the throttle casing involves a port member $G^2$ and a cap member $G^3$ which is threaded onto said port member so as to be readily removable when desired. The cap member is spaced from the face of the port member so as to provide a chamber $G^4$ which is connected directly to the pipe line E leading from the steam boiler and which in accordance therewith contains the water under the pressure at which it is supplied from the boiler. Within this port member are two ports or passages $G^5$ and $G^6$. The pipe line $E^1$ leading to the brake cylinder F is connected to the port $G^5$ while the return pipe $G^1$ is connected with the port $G^6$. The inner ends of these ports or passages terminate comparatively close together in the face $G^7$ of the port member. These ports, however, are controlled by a valve member $G^8$ which is carried upon and rotated by a suitable shaft $G^9$ having its bearing in the port member and having its end extended beyond the throttle casing for attachment to an actuating lever. The face $G^7$ of the port member forms a seat for the valve member and is machined and ground to a very accurate condition. The operating face $G^{10}$ of the valve member is likewise machined and ground so that an extremely accurate fit is maintained between the valve member and its seat. It will be observed, however, that since the water is contained under pressure in the chamber $G^4$ of the throttle casing and that this pressure always preponderates on the one side of the valve member it acts very effectively to maintain the valve member properly seated at all times, and without interfering in the least with the rotation of the valve member. This valve member is arranged to normally cover both of the ports $G^5$ and $G^6$ but it has in its face a cavity or passage $G^{11}$ which overlaps both of said ports and establishes communication therebetween. Thus the pipe line $D^5$ leading to the brake cylinder is normally in communication with the pipe $G^1$ leading directly to the water tank, this being the condition when the brake mechanism is being restored and during its periods of inactivity, hence the water forced out of the brake cylinder is restored directly to the supply tank. When it is desired to actuate the brakes the valve member is rotated in an anti-clockwise direction, as shown in Fig. 3, and this operation causes the valve member to carry its cavity $G^{11}$ away from the ports and thus sever the communication. The valve member is continued in this movement until its edge $G^{12}$ moves past and uncovers the port $G^5$ and thus establishes a direct communication between the water pressure chamber $G^4$ and the pipe line $E^1$ so that the water will flow into the brake cylinder. Now to release the brakes the valve member is simply rotated in a clockwise direction and communication between the ports $G^5$ and the chamber $G^4$ will be cut off and reëstablished with the port $G^6$. It will thus be observed that very little movement of the valve member is required to control the brake mechanism and that practically no physical effort on the part of the operator is required. This throttle may be positioned in any place on the vehicle accessible to the operator's hands or feet. In the construction shown I provide a pedal L which I attach to the end of the valve shaft $G^9$ and which is positioned convenient for the operator's foot. The movement of the foot necessary to operate this throttle, however, is very slight as compared with the usual type of brakes in which the strength of the operator constitutes the actuating force for the brakes and in which a comparatively long movement of the foot is necessary to effectively apply the brakes. For convenience in construction the port member is formed at the upper end of a pedestal or bracket M which is securely bolted or fastened upon the frame of the vehicle. The operating pedal L has an extension which is connected by a spring $L^1$ to the bracket for the purpose of restoring the pedal to its normal position.

I claim:

1. The combination of a steam propelled automobile having supporting wheels and brakes therefor and having a power plant including a steam generator containing water under pressure, hydraulic brake actuating mechanism embodying a cylinder having a piston movable therein and connected to actuate said brake mechanism, a reserve water tank carried by said automobile, pipe connections extending to said cylinder, and a throttle for connecting said pipe with said generator or said reserve tank.

2. The combination of an automobile frame and supporting wheels and brake mechanism therefor, a power plant including a steam generator containing water under pressure mounted on said frame, a cylinder, a plunger in said cylinder operable under the pressure of the water, means connecting the plunger to the brake mechanism for transmitting the power therefrom to said brake mechanism, pipe connections for conducting the water from the generator to said cylinder, a water tank on said frame containing a reserve supply of water, and a throttle in said pipe connections for controlling the flow of water to and from said cylinder.

3. The combination of an automobile having wheels and brakes associated therewith, a cylinder a movable plunger therein, a yielding connection between said plunger and said brakes, means located within the plunger for limiting the outward movement of the plunger to determine the maximum pressure to which said plunger is responsive, a source of water under variable pressure connected with said cylinder, and a controller for governing the flow of water to said cylinder.

4. A hydraulic brake system for automobiles comprising a source of water supply under pressure, brakes for the automobile and a hydraulically operated power mechanism connected with said source of water for actuating said brakes and embodying a cylinder, a plunger movable therein, a limit stop for determining its power stroke, a spring member carried by said plunger, brake rods extending from said spring to said brakes, a throttle for admitting water from said source to said cylinder, a water tank carried by said automobile, and means for directing the water from the cylinder into said tank when the plunger restores.

Signed by me at Chicago, Illinois, this 23rd day of Nov., 1916.

ABNER DOBLE.

Witnesses:
E. H. CLEGG,
AMY JEHLE.